US011910293B2

(12) United States Patent
Kakinada et al.

(10) Patent No.: US 11,910,293 B2
(45) Date of Patent: *Feb. 20, 2024

(54) OPTIMIZED MULTICAST MESSAGING IN LPWA NETWORKS

(71) Applicant: CHARTER COMMUNICATIONS OPERATING, LLC, St. Louis, MO (US)

(72) Inventors: Umamaheswar A. Kakinada, Englewood, CO (US); Hossam Hmimy, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,977

(22) Filed: Aug. 8, 2022

(65) Prior Publication Data

US 2022/0394587 A1 Dec. 8, 2022

Related U.S. Application Data

(63) Continuation of application No. 17/144,347, filed on Jan. 8, 2021, now Pat. No. 11,412,436.

(51) Int. Cl.
*H04W 40/02* (2009.01)
*H04W 72/04* (2023.01)
*H04W 40/34* (2009.01)
*H04W 40/12* (2009.01)
*H04W 72/21* (2023.01)

(52) U.S. Cl.
CPC ....... *H04W 40/026* (2013.01); *H04W 40/125* (2013.01); *H04W 40/34* (2013.01); *H04W 72/21* (2023.01)

(58) Field of Classification Search
CPC . H04W 40/026; H04W 72/21; H04W 40/125; H04W 40/34
USPC ........................................................ 370/312
See application file for complete search history.

(56) References Cited

U.S. PATENT DOCUMENTS

| 8,611,346 B1 | 12/2013 | Wijnands et al. |
| 9,860,677 B1 | 1/2018 | Agerstam et al. |
| 10,397,094 B2 | 8/2019 | Karthikeyan et al. |
| 2020/0252295 A1 | 8/2020 | Nolan et al. |

FOREIGN PATENT DOCUMENTS

| EP | 1814269 B1 | 9/2010 |
| WO | 20150193849 A1 | 12/2015 |

*Primary Examiner* — Gbemileke J Onamuti
(74) *Attorney, Agent, or Firm* — Patent Beach PC

(57) ABSTRACT

Various embodiments comprise systems, methods, architectures, mechanisms and apparatus for optimizing the delivery of multicast messages to a set of targeted (receiver) devices via a low power wide area (LPWA) network such as by minimizing a number of gateway devices in a set of gateway devices needed to reach the target devices, by optimizing the use of radio communication resources to minimize costs associated with using metered backhaul network services (e.g., costs associated with using cellular network backhaul services), by maximizing the resiliency, speed, or synchronization of the set of gateway devices, by favoring operator-owned resources, or by achieving other goals consistent with operator policies, preferences and other considerations.

20 Claims, 3 Drawing Sheets

OPTIMIZED MULTICAST MESSAGING IN LPWA NETWORKS

FIELD OF THE DISCLOSURE

The present disclosure generally relates to wireless communications systems and related networks, and more particularly to multicast routing of communications to target end devices via a plurality of gateways in a low power network.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Given the enormous and growing number of Internet of Things (IoT) devices to be serviced, and the expected insufficiency of traditional (licensed band) network services, various stakeholders in the fast growing IoT ecosystem are turning to low power wide area (LPWA) networks using unlicensed spectrum as an IoT servicing solution. For example, members of the LoRa Alliance are promoting the LoRaWAN protocol for applications such as IoT LPWAN connectivity via unlicensed bands, though the use of licensed bands is technically also feasible. See, e.g., LoRa Alliance TS001-1.0.4 LoRaWAN® L2 1.0.4 Specification (2020). Other protocols, standards, and the like directed to LPWA networks are being promoted by other groups.

LoRaWAN and similar networks are typically laid out in a star-of-stars topology in which gateways (e.g., gateways, concentrators, routers, access points, base stations, etc.) relay transmissions between end-devices and a central Network Server at the backend. Gateways are connected to a Network Server via standard IP connections, whereas end-devices use single-hop radio-frequency (RF) communication to one or many gateways. All communication is generally bi-directional, although uplink communication from an end-device to a Network Server is expected to be the predominant traffic.

LoRa and other LPWA networks offer support for multicast messages so as to reach many receiving IoT devices simultaneously for performing common or group tasks, such as distributing software updates and defining control and/or application functions for a cluster devices performing a certain function and/or located in a given region (e.g., street lights in a given city, controlled holiday lighting, a certain type of controllers in a factory).

Unfortunately, the relatively high latency of low power wide area networks becomes problematic when there is a need to reach these devices in a substantially simultaneous manner, such as for simultaneous activation of community lighting, triggering of sensors, and/or other applications.

SUMMARY

Various deficiencies in the prior art are addressed by systems, methods, architectures, mechanisms and apparatus for optimizing the delivery of multicast messages to a set of targeted (receiver) devices via a low power wide area (LPWA) network such as by minimizing a number of gateway devices in a set of gateway devices needed to reach the target devices, by optimizing the use of radio communication resources to minimize costs associated with using metered backhaul network services (e.g., costs associated with using cellular network backhaul services), by maximizing the resiliency, speed, or synchronization of the set of gateway devices, by favoring operator-owned resources, or by achieving other goals consistent with operator policies, preferences and other considerations.

In accordance with one embodiment, a method for routing a multicast message from a network server toward a plurality of target devices configured to communicate with a low power wide area (LPWA) network comprising a plurality of gateways, the method comprising: determining, for a multicast message to be routed toward the target devices via the LPWA network, a plurality of multicast paths wherein each multicast path comprises a respective set of gateways configured to reach all target devices; determining, for each respective set of gateways forming a multicast path, a composite weighted metric (CWM) in accordance with a plurality of selection factors, wherein each selection factor is weighted in accordance with an operator policy; selecting a multicast path comprising a set of gateways P having a lowest CWM; and transmitting the multicast message toward only the gateways included in the selected set of gateways P.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide systems, apparatus, and methods configured to determine, for members of a multicast/broadcast address in a LoRaWAN network, an optimized selection of gateway devices so as to optimize multicast message delivery to a set targeted devices in a manner that minimizes the number of gateways used to reach the targeted devices, optimizes usage of radio resources, and minimizes backhaul costs.

Figure 1:
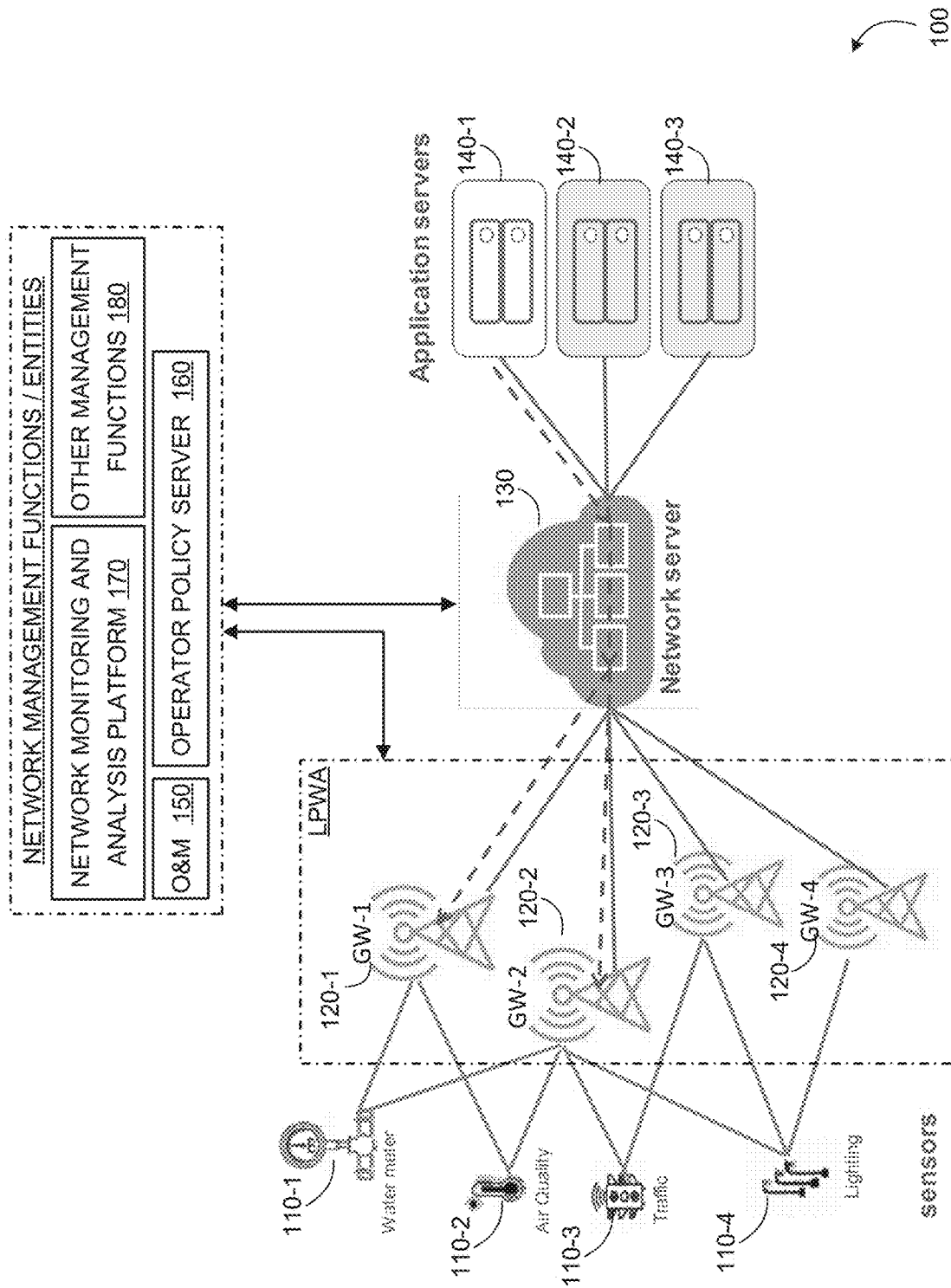
FIG. 1 depicts a block diagram of a system using a low power wide area (LPWA) network useful in illustrating the various embodiments.

FIG. 1 depicts a block diagram of a system using a low power wide area (LPWA) network useful in illustrating the various embodiments. Specifically, the system 100 of FIG. 1 comprises a plurality of end devices 110 comprising Internet of Things (IoT) or similar types of sensors, controls and the like (illustratively water meters 110-1, air quality meters 110-2, traffic controllers 110-3, lighting controllers 110-4 and/or other controller/sensors) configured to receive messages from one or more gateways 120 within a low power wide area (LPWA) network, such as a LPWA network in accordance with LoRaWAN or similar protocols.

As depicted in FIG. 1, the LPWA network is simplistically depicted as comprising four gateway devices; namely, 120-1 through 120-4 (gateways 120). A typical LPWA network may comprise thousands or even millions of such gateways. It is noted that the gateways forming an LPWA network are typically arranged in a star of stars type of configuration as is known.

As depicted in FIG. 1, a network server 130 is configured to coordinate with application servers 140 (illustratively three application servers 140-1, 140-2, and 140-3) to support the communications between the application servers 140 and end devices 110 such as for the delivery to end devices 110 of application control messages, application data, application software updates, end device configuration information and so on as provided by the application servers 140. Further, the network server 130 is configured to receive various messages including sensor data, end device status information and so on via the gateway devices 120 forming the LPWA network, and to transmit such received messages to the appropriate application server 140.

As depicted in FIG. 1, various network management functions/entities are shown such as a network operations and management (O&M) platform 150, an operator policy server 160, a network monitoring and analysis platform 170, and platforms/servers/entities supporting other management functions 180. For purposes of this discussion, the network monitoring and analysis platform 170 may be used to gather and analyze network statistics such as associated with the LPWA, the various gateways 120 forming the LPWA, the network server 130, and optionally the application servers 140.

Various elements or portions thereof depicted in FIG. 1 and having functions described herein are implemented at least in part as computing devices having communications capabilities, including for example the sensors/controllers 110, gateways 120, network server 130, application servers 140, O&M platform 150, an operator policy server 160, a network monitoring and analysis platform 170, and platforms/servers/entities supporting other management functions 180. These elements or portions thereof may comprise computing devices of various types, though generally including a processor element (e.g., a central processing unit (CPU) or other suitable processor(s)), a memory (e.g., random access memory (RAM), read only memory (ROM), and the like), various communications and input/output interfaces (e.g., enabling communications with other entities as indicated in FIG. 1), and so on as will be appreciated by those skilled in the art and informed by the teachings herein. Further, the various network management functions/entities may be implemented as fewer entities (e.g., combining O&M platform 150 and operator policy server 160), and may be implemented in whole or in part vie remote or third party platforms.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus, various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Multicast Messages to Target End Devices

Within the context of transmitting a message from an application server 142 to a target group of end devices 110, various embodiments contemplate using a multicast message such as where the target group of end devices may comprise a set of end devices sharing a common multicast MAC address. Further, the target group of end devices may be configured to remain in a power saving or quiescent mode of operation (i.e., unable to receive and/or respond to communications from a gateway 120) until a specific "activation time" whereupon each of the target group of end devices exit the power saving mode of operation and tunes/selects the appropriate RF channel(s) associated with the multicast MAC address so as to receive therefrom messages, control information and the like. Further, sensor devices associated with the target group of end devices may also transmit sensor information back toward the network server 130 or application server 140 via one or gateways 120 within reach of or capable of communicating with the end device.

Given the enormous scale of a typical LPWA network, various embodiments automatically select for each multicast message at least one set of gateways 120 providing a least cost (or at least lower cost) routing of multicast messages, which selection enables improved load balancing within the gateways 120 forming the LPWA network, helps to guide message routing so as to avoid congestion at final or intermediate gateways along a MAC address path or tree, and/or achieve other network management goals such as described herein.

It is noted that multiple sets of gateways (e.g., three lowest cost sets, or three lowest cost sets where each set uses a different one of several identified necessary but critically loaded/congested gateways) may be utilized to support redundancy, failover, resiliency, and/or other criteria.

In the example of FIG. 1, the network server 130 is operably connected to each of the gateways 120 and application servers 140, as indicated by respective solid lines therebetween. However, for a given multicast tree for services from a first application server 140-1, it is determined that only two of the gateways (e.g., 120-1 and 120-2) are needed to reach all of the relevant gateways, as indicated by a dashed line extending from the first application server 140-1 though the network server 130 and to the first and second gateways 120-1 and 120-2. As noted herein, more or fewer gateways may be used to support such multicast trees depending upon application requirements (e.g., monetary cost, security, redundancy, and so on).

Figure 2:
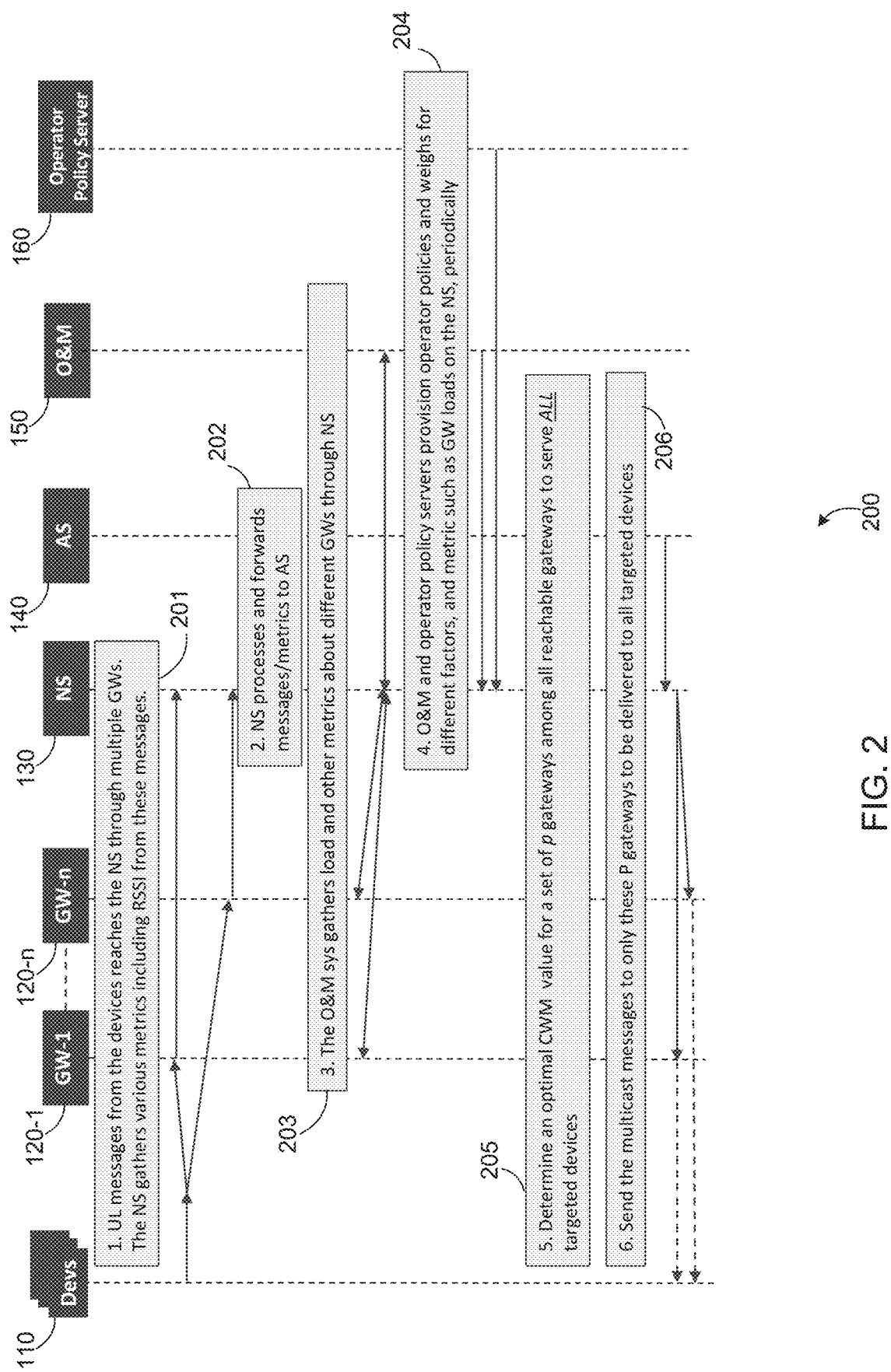
FIG. 2 depicts an exemplary signaling diagram and method according to an embodiment.

FIG. 2 depicts an exemplary signaling diagram and method according to an embodiment.

At step 201, upload messages from the various end devices reach the network server 130 via one or more gateways 120, whereupon the network server 130 gathers the various metrics associated with these upload messages such as a received signal strength indicator (RSSI) or other information indicative of received signal strength at the transmitting end device, routing information indicative of specific gateways used to route the message (useful in identifying over utilized and/or unexpectedly inactive gateways), and other metrics/information suitable for use in monitoring the performance of the LPWA network, the backbone network, and other elements supporting the upload messages.

At step 202, the network server 130 processes received upload messages and forwards the received upload messages and various metrics/information to the appropriate application servers 140.

At step 203, the operations and management (O&M) platform 150 gathers loading and other information/metrics pertaining to the gateways 120 forming the LPWA network. In various embodiments such information/metrics are retrieved via the network server 130. In other embodiments, such information/metrics may be retrieved by the network server 130 and/or various entities within the backbone network supporting the LPWA network. Specifically, FIG. 2 depicts communications between the network server 130 and O&M platform 150, and between the network server 130 and the various gateways 120, such communications being used to request desired information/metrics, receive automatically or schedule delivery of such information/metrics and so on.

At step 204, the O&M platform 150 and operator policy server 160 provide information useful in assessing gateway costs and multicast routing; namely, operator policies, identification of information/metrics of interest, waiting to be applied to the identified information/metrics of interest, and other information useful in ascertaining gateway and routing costs.

At step 205, for a multicast message intended to be simultaneously provided to each of a plurality of targeted end devices, an optimum composite weighted metric (CWM) value is determined to identify at least one set of p gateways to reach all of targeted end devices associated with a multicast message. A method for determining this one or set of p gateways will be discussed in more detail below with respect to FIG. 3. In various embodiments this determination is depicted as being made at the network server 130. However, in various other embodiments this determination may be made at another network management entity.

At step 206, the multicast message is transmitted toward those gateways within the set of p gateways determined that step 205.

It is noted that multiple or redundant or nested multicast message routing trees may be used to provide message resiliency such as in the case of mission-critical type control messages. As such, in some embodiments at step 2052 or more sets of gateways or determined, where each of the two or more sets of gateways may comprise lowest/lower cost gateway sets, a lowest cost gateway set and a backup high-reliability gateway set, or any other gateway set having different criteria.

Generally speaking, when the network server 130 needs to send a payload to set of targeted devices, it determines an optimized set of gateways to deliver the payload as multicast messages. This determination is based on a composite metric constructing using various factors of interest (e.g., performance, gateway cost, operator preferences and the like as described herein), where the various factors of interest are assigned weights such that each potential gateway to be included within the optimized set of gateways may be associated with a respective cost. The set of gateways meeting and optimal criteria such as an optimal cost criteria, and optimal resiliency criteria, and optimal speed criteria and the like may be selected as a single set of gateways for transmission of the multicast message, or one of several sets of gateways for transmission of the multicast message.

Figure 3:
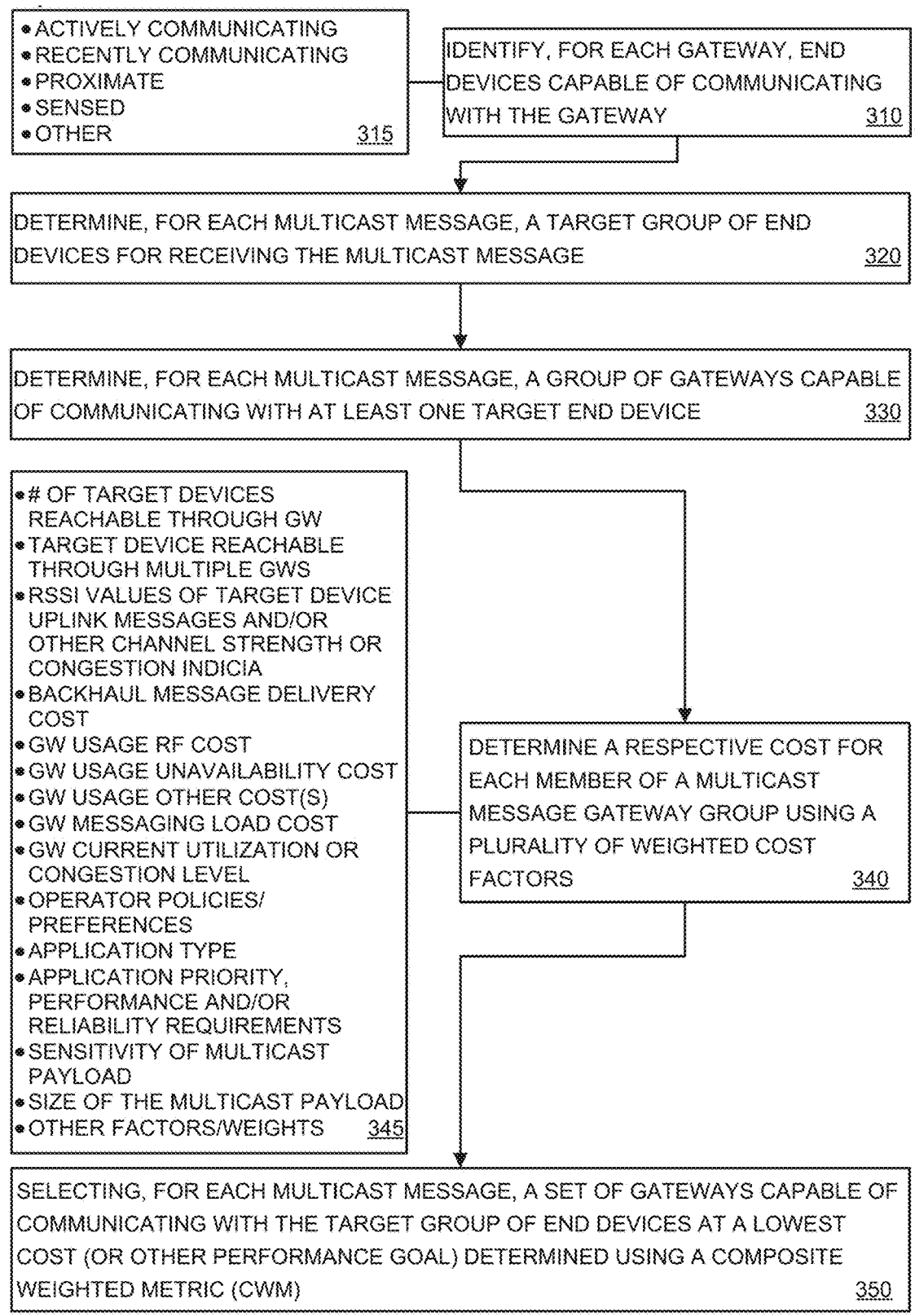
FIG. 3 depicts a flow diagram of a method for least cost routing of multicast messages in a low power, wide area network.

FIG. 3 depicts a flow diagram of a method for least cost routing of multicast messages in a LoRaWAN or similar type of network. The method may be performed at any provider equipment (PE) management entity such as the O&M platform 150, operator policy server 160, network monitoring and analysis platform 170, other network management entity, network server 130, or other device operably configured to obtain and process the relevant data as discussed below. This determining device may comprise, illustratively, a network manager operably configured to communicate with an EPC core, WiFi access network, and/or other network capable of supporting or implementing the system 100 of FIG. 1.

For purposes of this discussion, it will be assumed that multicast messages are configured to be transmitted to respective target groups of end devices via a network of gateways (e.g., a LoRaWAN network or similar) such as described above with respect to FIG. 1, and that the method operates to determine for each multicast message a respective least or lower cost set of gateways to receive the multicast message such that the respective target group of end devices substantially simultaneously receives the message.

At step 310, the end devices capable of communicating with each gateway (i.e., reachable by each gateway) are identified. Referring to box 315, such end devices may comprise those actively communicating with the gateway, those recently communicating with the gateway, those proximate the gateway such that they should be able to communicate with the gateway when activated, those fenced by the gateway or other proximate devices which should be able to communicate with the gateway when activated, and/or other end devices. It is noted that step 310 may be performed independent of the method 300 described herein, such as where a gateway device is constantly identifying reachable end devices. In various embodiments the gateways periodically report reachable devices to a management entity. With a star-of-stars topology LPWA network, the packets from a given device are carried by multiple Gateways to the server. This, in addition providing data transport, provides the server with information about the reachability of each of the devices through the multitude of the gateways in the network. This reachability information may be used in the various embodiments while sending packets toward the devices, such as for optimizing the number of gateways and/or the cost associated with using these gateways.

At step 320, for each multicast message a determination is made as to the corresponding target group of end devices to which the multicast message should be transmitted toward. For example, a target group of end devices may comprise a group of lighting or HVAC control devices associated with a building or industrial complex to which a multicast message including message or command configured to cause a coordinated illumination, HVAC operation, software update, status check, and/or other operation by each of the end devices within the target group of end devices. The target group of end devices may comprise a set of end devices sharing a common multicast MAC address that are configured to become active at a specific time (i.e., exit a power saving mode of operation) and tune/select the appropriate RF channel associated with the multicast MAC address so as to receive therefrom messages, control information and the like.

At step 330, for each multicast message a determination is made as to the corresponding group of gateways capable of communicating with at least one end device within the target group end devices determined at step 320. That is, at step 330 the gateways within the network capable of communicating with any of the target group end devices are identified or determined.

At step 340, a respective cost is associated with each member of a multicast message gateway group using a plurality of weighted cost factors. Referring to box 345, the cost factors F and corresponding weighting W may be based upon some or all of a number of target devices reachable through a particular gateway, whether a particular target devices reachable through multiple gateways, RSSI values and/or other channel strength/utilization indicators provided via target device uplink messages and the like, backhaul message delivery costs, gateway usage radiofrequency (RF) costs, gateway usage unavailability cost (e.g., assigned lost opportunity cost), gateway messaging load cost, operator policies and/or preferences, application type, application priority, reliability requirements, sensitivity (e.g., secrecy level, confidential level) of multicast payload, size of multicast payload, and/or other factors and/or weights as appropriate to the use case. That is, given the various cost factors deemed to be relevant and waited in accordance with the use case, application, urgency of implementation, operator requirement, customer requirement and the like, a cost of routing a multicast message via each of the relevant gateways is determined.

At step 350, for each multicast message a selection is made of a set of gateways capable of communicating with the target group of end devices at a lowest cost (or other performance goal such as speed, resiliency, synchronization, application-specific performance characteristics, and the like) as determined using a composite weighted metric (CWM). That is, given that a number of different sub groupings or subsets of the relevant gateways may be used to deliver in multicast message to the target end devices, the sub grouping or subsets of gateways providing a least cost routing of the multicast message is selected or use. It is noted that multiple sets of gateways may be utilized to support redundancy, failover, resiliency, and/or other criteria.

In various embodiments, for each multicast session an optimized set (or sets) of gateways numbered p among all reachable gateways is determined in accordance with the following equation, where Fi is a value of a factor i, Wi is a weight given to a factor i, GWk is a favorability/cost metric of a gateway k, and p is a subset of gateways among all reachable gateways which can be used to reach all target end devices:

$$\sum_{k=1}^{k=p}\sum_{i=1}^{i=n} GWk*(Fi \times Wi)$$

The various factors Fi and their given weight may be determined based on individual sessions, session types, application types, session or application priority, operator performance requirements and/or other goals. Weighting may comprise assigning unitary fractions to each of the i factors Fi to be considered (i.e., adding up each of the corresponding weights Wi equals 1). Other methods of weighting may also be used.

Multicast sessions having cost-related goals may prioritize propagation of instructions to end devices 110 via the (monetarily) least cost path available. For sessions or applications where cost is the primary goal, an operator may be willing to use third party gateways 120 only if such use is absolutely necessary to reach the relevant population of end devices 110. Typically, an operator will favor the use of the operator's own gateways 120, and may favor the use of specific high-performance gateways deployed by the operator to support high volume, lower cost multi-cast sessions/streams (e.g., high volume gateways deployed at stadiums or other events to support transient high-volume access to data by attendees).

Multicast sessions having higher performance goals may prioritize rapid or simultaneous propagation of instructions to end devices 110, wherein gateways 120 offering faster, more reliable, or more synchronized operation are weighted higher than other gateways 120. For sessions or applications where performance is critical, an operator may over-weight corresponding factors such as the use of paths formed with gateways 120 associated with third parties even if additional costs are incurred.

Multicast sessions having higher reliability or redundancy goals may prioritize propagation of instructions to end devices 110 via at least two paths, such as where end devices 110 and/or gateways 120 operate in challenging/difficult environments. For sessions or applications where reliability/redundancy is critical, an operator may be willing to use multiple paths sufficient to provide communication with every relevant end device 110 via at least two proximate gateways 120 (e.g., two paths may be used to deliver the instructions, or two multicast sessions may be used to deliver the instructions where each session uses a respective/different path).

Some exemplary factors Fi are presented below with respect to Table 1.

TABLE 1

| Factor Fi | Weight Wi (lowest cost) | Weight Wi (fastest) | Weight Wi (most reliable) |
|---|---|---|---|
| Number of relevant target devices reachable through a gateway | 0.02 | 0.04 | 0.06 |
| Number of relevant target devices reachable only through a gateway | 0.02 | 0.04 | 0.06 |
| RSSI values and/or other channel strength/utilization indicators of a gateway provided via target device uplink messages | 0.02 | 0.04 | 0.06 |
| Backhaul message delivery costs of a gateway | 0.02 | 0.04 | 0.06 |
| Radiofrequency (RF) usage costs of a gateway | 0.02 | 0.04 | 0.06 |
| Gateway messaging load cost | 0.02 | 0.04 | 0.06 |
| Gateway current utilization/congestion level | 0.02 | 0.04 | 0.06 |
| Gateway predicted utilization/congestion level based on size/duration of multicast payload | 0.02 | 0.04 | 0.06 |
| Gateway usage unavailability cost (e.g., assigned lost opportunity cost) | 0.02 | 0.04 | 0.06 |
| Gateway suitability to application type | 0.02 | 0.04 | 0.06 |
| Gateway suitability to application priority | 0.02 | 0.04 | 0.06 |
| Gateway suitability to reliability requirements | 0.02 | 0.04 | 0.06 |
| Gateway suitability to performance requirements | 0.02 | 0.04 | 0.06 |
| Gateway suitability to sensitivity of multicast payload | 0.02 | 0.04 | 0.06 |
| Gateway conformance with operator policies and/or preferences (speed, reliability, captive or third party, etc.) | 0.02 | 0.04 | 0.06 |
| Other factors | 0.02 | 0.04 | 0.06 |

The above is an example of weightages assigned to different factors under consideration, it does not preclude or limit inclusion of other factors or variation of the assigned weights. These weightages may be influenced further from operational data analytics and historical operational, observed degree of compliance with intended policies and specifications.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for routing a multicast message from a network server toward a plurality of target devices configured to communicate with a low power wide area (LPWA) network comprising a plurality of gateways, the method comprising:
   determining, for a multicast message to be routed toward the target devices via the LPWA network, a plurality of multicast paths wherein each multicast path comprises a respective set of gateways configured to reach all target devices;
   determining, for each respective set of gateways forming a multicast path, a composite weighted metric (CWM) in accordance with a plurality of selection factors, wherein each selection factor is weighted in accordance with an operator policy;
   selecting a multicast path comprising a set of gateways P having a lowest CWM; and
   transmitting the multicast message toward only the gateways included in the selected set of gateways P.

2. The method of claim 1, wherein the plurality of selection factors for each gateway comprises at least one of a number of target devices reachable only through the gateway, and a received signal strength indicator (RSSI) of target devices proximate the gateway.

3. The method of claim 1, wherein the plurality of selection factors for each gateway comprises a backhaul message delivery cost of the gateway.

4. The method of claim 2, wherein the RSSI of target devices proximate the gateway comprises a measured RSSI values received in uplink message from target devices.

5. The method of claim 2, wherein the RSSI of target devices proximate the gateway comprise calculated RSSI values based on proximity of gateway and target devices.

6. The method of claim 1, wherein the plurality of selection factors for each gateway further comprises at least one of a number of target devices reachable by the gateway, a gateway radio frequency (RF) usage cost, and a gateway messaging load cost.

7. The method of claim 1, wherein the plurality of selection factors for each gateway further comprises at least one of a current gateway utilization level cost, and a predicted gateway utilization level.

8. The method of claim 1, wherein the plurality of selection factors for each gateway further comprises at least one of a gateway application type suitability, a gateway application priority suitability, a gateway reliability suitability, a gateway security suitability, and a gateway performance suitability.

9. The method of claim 1, wherein the plurality of selection factors for each gateway further comprise at least one of a gateway usage unavailability cost, and a gateway conformance with operator policies/preferences.

10. The method of claim 1, further comprising:
   selecting a second multicast path comprising a set of gateways P2 having a second lowest CWM; and said transmitting comprises transmitting the multicast message toward the gateways included in each of the two selected sets of gateways P and P2.

11. The method of claim 1, wherein for each multicast session a selected set of gateways numbered among all reachable gateways is determined in accordance with the following equation, where Fi is a value of a factor i, Wi is a weight given to a factor i, GWk is a favorability/cost metric of a gateway k, and p is a subset of gateways among all reachable gateways which can be used to reach all target end devices:

$$\sum_{k=1}^{k=p}\sum_{i=1}^{i=n} GWk * (Fi \times Wi).$$

12. The method of claim 11, wherein the weight Wi given to each factor Fi is selected to provide a CWM for determining a set of gateways P configured to provide a low cost multicast tree.

13. The method of claim 11, wherein the weight Wi given to each factor Fi is selected to provide a CWM for determining a set of gateways P configured to provide one of a high speed multicast tree and a high reliability multicast tree.

14. The method of claim 11, further comprising:
selecting a second multicast path comprising a set of gateways P2 having a second lowest CWM; and
said transmitting comprises transmitting the multicast message toward the gateways included in each of the two selected sets of gateways P and P2.

15. The method of claim 14, wherein the weight Wi given to each factor Fi is selected to provide a CWM for determining sets of gateways P and P2 configured to provide one of low cost multicast trees and high reliability multicast trees.

16. The method of claim 14, wherein the weight Wi given to each factor Fi is selected to provide a CWM for determining a set of gateways P configured to provide a high reliability multicast tree, and a CWM for determining a set of second gateways P2 configured to provide a high reliability multicast tree.

17. A system for determining multicast routes for messages from a network server toward a plurality of target devices configured to communicate with a low power wide area (LPWA) network comprising a plurality of gateways, the system comprising:
a network manager, operably coupled to the network server and configured for:

determining, for a multicast message to be routed toward the target devices via the LPWA network, a plurality of multicast paths wherein each multicast path comprises a respective set of gateways configured to reach all target devices;
determining, for each respective set of gateways forming a multicast path, a composite weighted metric (CWM) in accordance with a plurality of selection factors, wherein each selection factor is weighted in accordance with an operator policy;
selecting a multicast path comprising a set of gateways P having a lowest CWM; and
transmitting the multicast message toward only the gateways included in the selected set of gateways P.

18. The system of claim 17, wherein the plurality of selection factors for each gateway comprises at least one a number of target devices reachable only through the gateway, a received signal strength indicator (RSSI) of target devices proximate the gateway, and a backhaul message delivery cost of the gateway.

19. The system of claim 17, wherein the RSSI of target devices proximate the gateway comprises at least one of measured RSSI values received in uplink message from target devices and calculated RSSI values based on proximity of gateway and target devices.

20. A tangible and non-transient computer readable storage medium storing instructions which, when executed by a computer, adapt the operation of the computer to provide a method for routing multicast messages from a network server toward a plurality of target devices configured to communicate with a low power wide area (LPWA) network comprising a plurality of gateways, the method comprising:
determining, for a multicast message to be routed toward the target devices via the LPWA network, a plurality of multicast paths wherein each multicast path comprises a respective set of gateways configured to reach all target devices;
determining, for each respective set of gateways forming a multicast path, a composite weighted metric (CWM) in accordance with a plurality of selection factors, wherein each selection factor is weighted in accordance with an operator policy;
selecting a multicast path comprising a set of gateways P having a lowest CWM; and
transmitting the multicast message toward only the gateways included in the selected set of gateways P.

* * * * *